United States Patent
Tabler

[15] 3,692,852
[45] Sept. 19, 1972

[54] SEMI-HOMOGENEOUS LIQUID SUSPENSION CATALYST COMPLEX FOR SELECTIVE HYDROGENATION

[72] Inventor: Donald C. Tabler, Bartlesville, Okla.

[73] Assignee: Phillips Petroleum Company

[22] Filed: May 21, 1970

[21] Appl. No.: 39,542

[52] U.S. Cl. ........260/666 A, 260/683.2, 252/431 C, 260/683
[51] Int. Cl. ..........C07c 5/24, C07c 5/02, C07c 5/14
[58] Field of Search ............260/666 A, 666 B, 683.2

[56] References Cited

UNITED STATES PATENTS

| | | | |
|---|---|---|---|
| 3,418,386 | 12/1968 | Hayes | 260/666 A |
| 3,249,641 | 3/1966 | Storrs | 260/666 B |
| 3,271,468 | 9/1966 | Wilke et al. | 260/666 B |
| 3,277,099 | 10/1966 | Seibt | 260/666 B |
| 3,377,397 | 4/1968 | Maxfield | 260/666 B |
| 3,390,195 | 6/1968 | Chappell et al. | 260/666 B |
| 3,392,203 | 7/1968 | Olechowski et al. | 260/666 B |
| 3,420,904 | 1/1969 | Hellwig | 260/666 B |
| 3,432,530 | 3/1969 | Wilke et al. | 260/429 |
| 3,446,871 | 5/1969 | Maxfield | 260/683.15 |
| 3,471,581 | 10/1969 | Maxfield | 260/666 A |

*Primary Examiner*—Delbert E. Gantz
*Assistant Examiner*—Veronica O'Keefe
*Attorney*—Young and Quigg

[57] ABSTRACT

A method for preparing a semi-homogeneous liquid suspension catalyst complex containing (1) an organometal compound, (2) at least one of nickel, iron, and cobalt, and (3) at least one of antimony, arsenic, or bismuth; and a process for the double bond isomerization, selective hydrogenation of a feedstock containing olefinic hydrocarbons having more than one double bond per molecule as well as trienes and acetylenes wherein said catalyst complex is utilized.

4 Claims, No Drawings

SEMI-HOMOGENEOUS LIQUID SUSPENSION CATALYST COMPLEX FOR SELECTIVE HYDROGENATION

This invention relates to selective hydrogenation. In another aspect this invention relates to the use of a metal catalyst complex, in liquid suspension for the double bond isomerization, and/or selective hydrogenation of carbon-to-carbon, unsaturated hydrocarbons. In yet another aspect this invention relates to a semihomogeneous liquid suspension catalyst complex consisting of at least one of nickel, iron, cobalt, and at least one of antimony, arsenic, and bismuth; as well as a method for preparing said catalyst complex.

Various combinations of the aforementioned complexes are known as selective hydrogenation catalysts for the conversion of dienes and other unsaturated compounds to monoenes. Several of these catalyst complexes require sulfur additives in order to maintain activity which can lead to hydrogenated products containing undesirable sulfur as a contaminant. Heterogeneous, supported metal catalysts of the aforementioned complexes are often subjected to fouling gum deposits when used for treating vapor phase compounds.

I have discovered a semi-homogeneous liquid suspension, selective hydrogenation catalyst complex. The catalyst complex of my invention can be prepared by mixing a hydrocarbon-soluble compound of at least one of nickel, iron, or cobalt with a hydrocarbon-soluble compound of at least one of arsenic, antimony, or bismuth in a suitable solvent, which upon the addition of an organometal compound forms a semihomogeneous liquid suspension complex. The semi-homogeneous liquid suspension of the aforementioned compounds is a selective hydrogenation catalyst complex for the hydrogenation of dienes, trienes, and acetylenes to monoenes inclusive of cyclic or acyclic compounds. The semi-homogenous liquid suspension catalyst complex of my invention can also be employed for double bond isomerization of compounds containing unsaturated carbon-to-carbon bonding. Objectionable auxiliary materials required by other hydrogenation catalysts are not required by the catalyst complex of my invention, nor does my semi-homogeneous liquid suspension catalyst face the fouling problems of solid, supported catalysts.

It is an object of this invention to provide a semi-homogeneous liquid hydrogenation catalyst complex and a method for its preparation.

It is another object of this invention to provide a selective hydrogenation process catalyst wherein the catalyst can be used for sustained periods without requiring regeneration due to typical catalyst poisons and gums experienced by solid heterogeneous catalysts.

The method of this invention is applicable to the double bond isomerization, selective hydrogenation of olefinic feed stocks. The process is selective because it provides a method of hydrogenating materials such as dienes, trienes, acetylenes, cyclic and acyclic polyenes, and the like; without substantial activity for the hydrogenation of monoolefins.

The method of this invention also includes the catalytic double bond isomerization as well as selective catalytic hydrogenation process. Exemplary of this isomerization-selective hydrogenation catalytic process is the hydrogenation of 1,5-cyclooctadiene; the 1,5-diolefin is first isomerized to the 1,4- form, which in turn is isomerized to the 1,3- form, which is then hydrogenated mainly to monoenes. Support for the above exemplary process is found in Tables I and II of this disclosure.

When applied to a cyclic or acyclic polyene, the process selectively hydrogenates these to cyclic or acyclic monoenes with substantial selectivity depending upon the specific feeds, catalysts, and conditions used. Similarly, feedstreams which contain substantial amounts of monoenes can be effectively hydrotreated to hydrogenate minor amounts of impurities, e.g., acetylenes, dienes, trienes, without significant conversion of the monoenes to saturates. Thus, the invention is applicable to hydrogenating olefinic feed stocks where monoenes are a substantial portion of the product.

Olefinic refinery streams can be used as feedstock for the process of this invention. Applicable compounds found in such feedstocks are olefinic hydrocarbons having more than one double bond per molecule as well as trienes and acetylenes. As a matter of practical commercial application, compounds having up to about 12 carbon atoms per molecule are preferred. Some examples of these dienes, trienes, and acetylenes are: hexadienes, heptadienes, cyclooctadienes, cyclododecatrienes, vinylcyclohexene, cyclopentadiene, vinylacetylene, butyne, and the like, and mixtures thereof.

Similiarly, the monoenes which can be subjected to the process of the present invention for hydro treatment of impurities and/or double bond isomerization include any cyclic or acyclic olefins which are normally hydrogenatable. As a practical matter, monoenes of up to about 16 carbon atoms per molecule are of commercial importance and are preferred. Some examples of these are: hexenes, heptenes, octenes, cyclooctene, cyclododecene, cyclopentene, dodecene, tetradecene, hexadecene, and the like, and mixtures thereof.

The catalysts of my invention are the arsenic, antimony, or bismuth complexes of iron, cobalt, and nickel. In its preferred form, the catalyst complex is in a liquid suspension, semi-homogeneous solution wherein the hydrocarbon solvent is selected from the group hexane, heptane, octane, cyclohexane, benzene, toluene, xylene, etc. An organometal compound, as example, triethylaluminum, is introduced to the above catalyst complexes, completing the liquid suspension prior to use. Nickel-arsenic and nickel-antimony and their respective combinations are the preferred catalyst complexes of this invention. The aforementioned combinations could exist in various forms such as a fine suspension of free metal, a metal hydride, complexes of the Ni—As or Ni—Sb with triethylaluminum or combinations thereof. The semi-homogeneous liquid suspension as discussed above presents to the art complexes, of which the true chemical characteristics are not known, It has been necessary, therefore, to use the term "complex" in association with the term "catalyst" when referring to the semi-homogeneous liquid suspension catalysts of this invention.

Generally, the catalyst complexes of this invention have a molar relationship which can be represented by the formula $MY_x$ wherein M is a metal selected from the group consisting of nickel, cobalt and iron, Y is arsenic, antimony or bismuth and x has a value of about 0.1 to about 2.0, preferably about 0.33 to about 1.0. Because of its greater selectivity, Y is preferably antimony.

For purposes of this disclosure, the invention will be explained in terms of the nickel arsenide or nickel antimonide catalysts without meaning to limit the invention thereto. All uses and applications of any one of the catalysts specifically designated are intended to apply to all of the catalysts which are the subject of this invention.

In the preparation of the catalyst complex, the nickel and arsenic, or antimony, can be simultaneously dissolved in a suitable hydrocarbon solvent, prior to adding the triethylaluminum therein, forming the semi-homogeneous suspension of the catalyst of my invention. It has been found by reacting nickel octoate, triphenylarsine, or triphenylantimony, and triethylaluminum in a hydrocarbon solvent there is formed a semi-homogeneous catalyst complex suitable for the selective hydrogenation of dienes, trienes, and acetylenes to monomers. The molar ratio of nickel plus arsenic or antimony to the triethylaluminum has been held at about 1:1, but different ratios of nickel to arsenic or antimony have been found to be applicable. The catalyst complexes have been tested by hydrogenating, for example, cyclooctadiene in an autoclave. It has been found that the ratio of nickel to arsenic or antimony was important in producing active and selective catalysts. When the mole ratio was three nickel to one arsenic the catalyst was active and selective for both isomerization and hydrogenation. When the mole ratio was three nickel to two arsenic, the catalyst was less active for hydrogenation, but was still active for double-bond isomerization. The results of the various combinations of catalyst components of my invention will be more fully disclosed later in tabulated form.

The conditions under which the method of this invention is employed, whether for selective hydrogenation or double bond isomerization, can vary widely. Generally, the reaction is conducted by contacting the olefinic feedstream, with hydrogen, and the catalyst complex wherein the reaction zone is maintained at a temperature of 400° to about 400° F., preferably from about 450° to about 480° F. A suitable pressure range for the hydrogenation or double bond isomerization reaction, when using the catalyst complexes of this invention, varies from 200 to 1000 psig. The olefinic feedstream is contacted with the catalyst complex at a rate sufficient to provide a contact time of from about 20 to about 60 minutes. Hydrogen is introduced at a rate which provides a hydrogen to feed molar ratio of from about 1:1 to about 2:1.

The following example indicates the method of preparing the catalyst complexes of this invention.

EXAMPLE I

The following components were put into a Diels-Alder* (*A Diels-Alder tube is a heavy walled glass test tube with a metal crowned top including an internal rubber seal with the metal top having an opening therein for injection purposes. ) tube containing a nitrogen atmosphere in the following order:

| | |
|---|---|
| 0.5 molar nickeloctoate in cyclohexane | 4.0 ml |
| 0.5 molar triphenylantimony in cyclohexane | 1.33 ml |
| 1.0 molar triethylaluminum in cyclohexane | 2.8 ml |

When the triethylaluminum was added to the mixture in the tube, a black suspension formed immediately and the temperature of the mixture rose to about 100° F.

EXAMPLE II

The following components were mixed in a Diels-Alder tube as in Example I:

| | |
|---|---|
| 0.5 molar nickeloctoate in cyclohexane | 4.0 ml |
| 0.5 molar triphenylarsine in cyclohexane | 2.7 ml |
| 1.0 molar triethylaluminum in cyclohexane | 3.4 ml |

The resultant mixture was a black suspension which looked like that described in Example I. In both Examples I and II, the catalyst complex was transferred from the Diels-Alder tubes to the autoclave containing the olefinic feed using a hypodermic syringe to minimize contact with air.

The catalyst complexes as prepared in Examples I and II were employed for the selective hydrogenation of an olefinic feedstream comprised of 48 grams of 1,5-cyclooctadiene diluted with 230 grams of cyclohexane. The conditions under which the run was conducted and the isomerization and selective hydrogenation effected are indicated in tabulated form below.

TABLE I

Isomerization and Hydrogenation of 1,5-Cyclooctadiene with a Semi-homogeneous Catalyst Complex Containing Nickel and Antimony and Triethylaluminum As prepared in Example I:

| | |
|---|---|
| Catalyst composition, molar Proportions: | 3 Ni; 1 Sb, 4 TEA |
| Catalyst concentration, mols Ni/mol diolefin: | 0.004 |
| Reaction temperature: | 470°F |
| Original Hydrogen Pressure at room temperature: | 500 psig |

Product Analyses At Various Reaction Times:

| Run Number | 1 | 2 | 3 | 4 | 5 |
|---|---|---|---|---|---|
| Reaction time, at Reaction Temp. in minutes | 0 | 20 | 35 | 50 | 65 |
| Analyses, Weight % | | | | | |
| Cyclooctane | trace | 1.4 | 2.7 | 4.5 | 6.5 |
| Cyclooctene | 1.1 | 42.1 | 66.6 | 83.4 | 89.2 |
| 1,3-Cyclooctadiene | 2.8 | 51.1 | 30.0 | 12.1 | 4.3 |
| 1,4-Cyclooctadiene | 9.9 | 3.7 | 0.7 | 0.0 | 0.0 |
| 1,5-Cyclooctadiene | 86.2 | 1.7 | 0.0 | 0.0 | 0.0 |

TABLE II

Isomerization and Hydrogenation of 1,5-Cyclooctadiene with a Semi-homogeneous Catalyst Complex Containing Nickel and Arsenic and Triethylaluminum

| | |
|---|---|
| Catalyst composition, molar proportions: | 3 Ni, 1 As; 4 TEA |
| Catalyst Concentration, mols Ni/mols diolefin | 0.004 |
| Reaction temperature: | 470°F |
| Original Hydrogen Pressure at room temperature: | 500 psig |

Product Analyses At Various Reaction Times:

| Run Number | 1 | 2 | 3 | 4 | 5 | 6 | 7 |
|---|---|---|---|---|---|---|---|
| Reaction time, at Reaction Temp. in minutes | 0 | 10 | 25 | 40 | 60 | 75 | 90 |
| Analyses, Weight % | | | | | | | |
| Cyclooctane | 0.0 | 0.0 | 0.5 | 0.9 | 4.8 | 15.6 | 31.9 |
| Cyclooctene | 0.0 | 1.04 | 3.53 | 23.8 | 67.0 | 82.2 | 68.1 |
| 1,3-Cyclooctadiene | 2.4 | 5.6 | 14.13 | 39.1 | 21.6 | 2.2 | 0.0 |
| 1,4-Cyclooctadiene | 8.5 | 14.4 | 23.0 | 20.1 | 3.9 | 0.0 | 0.0 |
| 1,5-Cyclooctadiene | 89.1 | 79.0 | 58.9 | 16.1 | 2.7 | 0.0 | 0.0 |

The following Table III illustrates the effect of varying the combination amounts of nickel and arsenic in the selective catalyst complex as to hydrogenation and double bond isomerization activity.

TABLE III

Isomerization and Hydrogenation of 1,5-Cyclooctadiene with a Semi-homogeneous Catalyst Complex Containing Nickel and Arsenic and Triethylaluminum

| | Data |
|---|---|
| Feedstock: | 16 wt. % cyclooctadiene in cyclohexane |
| Catalyst Level: | 0.004 mols/mol diene |
| Original H$_2$ press: | 500 psig at room temperature |

| Run No. | 3 | 4* | |
|---|---|---|---|
| Temperature | 500 | 480 | |
| Run Duration (at temp), hours | 3 | 2 | |
| Mol ratio Ni to As | 3N–1As | 3Ni–2As | |
| Product Analysis (Solvent-Free Basis) | | | |
| Light unknowns | 1.25 | 0.66 | |
| Cyclooctane | 98.53 | 1.64 | |
| Cyclooctene | 0.22 | 20.6 18.4 | |
| 1,3-Cyclooctadiene | None | 45.0 ) | Note |
| 1,4-Cyclooctadiene | None | 20.6 ) | double-bond |
| 1,5-Cyclooctadiene | None | 13.6 ) | isomerization activity |

*Run No. 4 catalyst was prepared as disclosed by Example II.

Table IV below illustrates the effectiveness of the method and the two preferred catalyst complexes of this invention in hydrotreating a selected diene in the presence of pure hydrogen.

TABLE IV

| Run No. | 16 | 17 |
|---|---|---|
| Temperature, °F | 470 | 470 |
| Catalyst composition, molar ratios | 3Ni–1Sb | 3Ni–1As |
| Run Duration Hrs. at Temp. | 4 TEA 1.0 | 4 TEA 1.25 |
| Product Analysis, Wt. % | | |
| Cyclooctane | 6.5 | 15.6 |
| Cyclooctene | 89.2 | 82.2 |
| 1,3-Cyclooctadiene | 4.3 | 2.2 |
| 1,4-Cyclooctadiene | 0.0 | 0.0 |
| 1,5-Cyclooctadiene | 0.0 | 0.0 |
| Conversion, % | 95 | 98 |
| Selectivity to Monoenes, % | 95 | 84 |
| Catalyst concentration: | 0.004 mols/mol diene | |
| Original Hydrogen Pressure: | 500 psig at room temperature | |

These data illustrate the effectiveness of the various combinations of the catalyst complexes used in my invention for selective hydrogenation as well as double-bond isomerization.

It will be evident from the foregoing that various modifications can be made of the method as well as the catalyst complexes of this invention. However, such are considered as being within the scope of the invention.

What I claim is:

1. A double-bond isomerization, selective hydrogenation process, comprising: contacting cyclic olefinic hydrocarbons having more than one double bond per molecule with hydrogen; a liquid suspension catalyst complex having a molar relationship represented by the formula MY$_x$ wherein M is a metal selected from the group consisting of nickel, cobalt, and iron, Y is selected from the group consisting of arsenic, and antimony with x having a value of from about 0.1 to about 2.0; triethylaluminum; and a hydrocarbon solvent.

2. A process according to claim 1 wherein M is nickel and Y is arsenic.

3. A process according to claim 1 wherein M is nickel and Y is antimony.

4. A process according to claim 1 wherein the reaction conditions include a temperature of from about 400° F. to about 500° F, a pressure of about 200 psig to about 1000 psig, a hydrogen-to-feed stream ratio of from about 1:1 to about 2:1, and a feedstream-hydrogen-catalyst contact time of about 20 to about 60 minutes.

* * * * *